(12) United States Patent
McElhiney

(10) Patent No.: US 9,550,443 B2
(45) Date of Patent: Jan. 24, 2017

(54) VEHICLE CONTAINMENT AND TRANSPORT SYSTEMS AND METHODS

(71) Applicant: Bike Box, LLC, Elkmont, AL (US)

(72) Inventor: Chad S. McElhiney, Elkmont, AL (US)

(73) Assignee: Bike Box, LLC, Elkmont, AL (US)

( * ) Notice: Subject to any disclaimer, the term of this patent is extended or adjusted under 35 U.S.C. 154(b) by 0 days.

(21) Appl. No.: 14/877,648

(22) Filed: Oct. 7, 2015

(65) Prior Publication Data

US 2016/0096566 A1 Apr. 7, 2016

Related U.S. Application Data

(60) Provisional application No. 62/060,861, filed on Oct. 7, 2014.

(51) Int. Cl.
| | | |
|---|---|---|
| *B62D 24/00* | (2006.01) | |
| *B60P 3/077* | (2006.01) | |
| *B62D 33/04* | (2006.01) | |
| *B62D 59/04* | (2006.01) | |
| *B60P 3/073* | (2006.01) | |
| *B60P 3/12* | (2006.01) | |

(52) U.S. Cl.
CPC .............. *B60P 3/077* (2013.01); *B60P 3/073* (2013.01); *B60P 3/122* (2013.01); *B62D 24/00* (2013.01); *B62D 33/04* (2013.01); *B62D 59/04* (2013.01)

(58) Field of Classification Search
CPC ..... B62D 21/14; B62D 53/067; B62D 63/061; B62D 63/065
See application file for complete search history.

(56) References Cited

U.S. PATENT DOCUMENTS

| | | |
|---|---|---|
| 3,915,323 A | 10/1975 | Underhill |
| 4,752,177 A | 6/1988 | Zenna |
| 6,331,094 B1 | 12/2001 | Burrows |
| 6,471,278 B2 | 10/2002 | Leitner et al. |
| 6,935,670 B2 | 8/2005 | Bright |
| 6,945,343 B1* | 9/2005 | Moreau ................. B60D 1/246 180/11 |
| 2002/0009344 A1 | 1/2002 | Heim et al. |
| 2004/0262946 A1 | 12/2004 | Rasmussen |
| 2004/0262948 A1 | 12/2004 | Parmer |
| 2010/0059966 A1* | 3/2010 | Ireland ..................... B60R 3/00 280/414.1 |
| 2011/0072999 A1 | 3/2011 | Banwart |
| 2011/0284603 A1 | 11/2011 | Reyes |
| 2012/0183369 A1 | 7/2012 | Landoll et al. |
| 2012/0267913 A1 | 10/2012 | Ostberg |

\* cited by examiner

*Primary Examiner* — John Walters
*Assistant Examiner* — James Triggs
(74) *Attorney, Agent, or Firm* — Ann I. Dennen

(57) ABSTRACT

A system of the present disclosure has a housing that has at least two female indentations, and each indentation has tapered walls that form a cavity. The system further has a trailer that has at least two protrusions, including a first protrusion on a first leg of the trailer and a second protrusion on a second leg of the trailer, and the protrusions are arranged to mate with the at least two female indentations when the housing is placed on the trailer. Each protrusion has a lock slat slidably moveable in a slot formed in a side of the protrusion and the lock slats are adapted to engage one of the tapered walls of the protrusions thereby retaining the housing on the trailer.

18 Claims, 19 Drawing Sheets

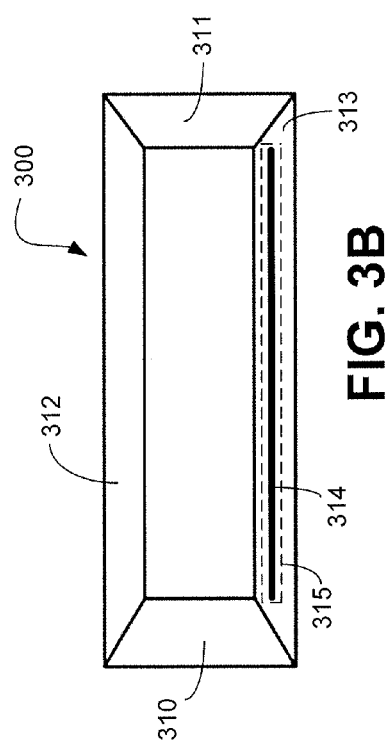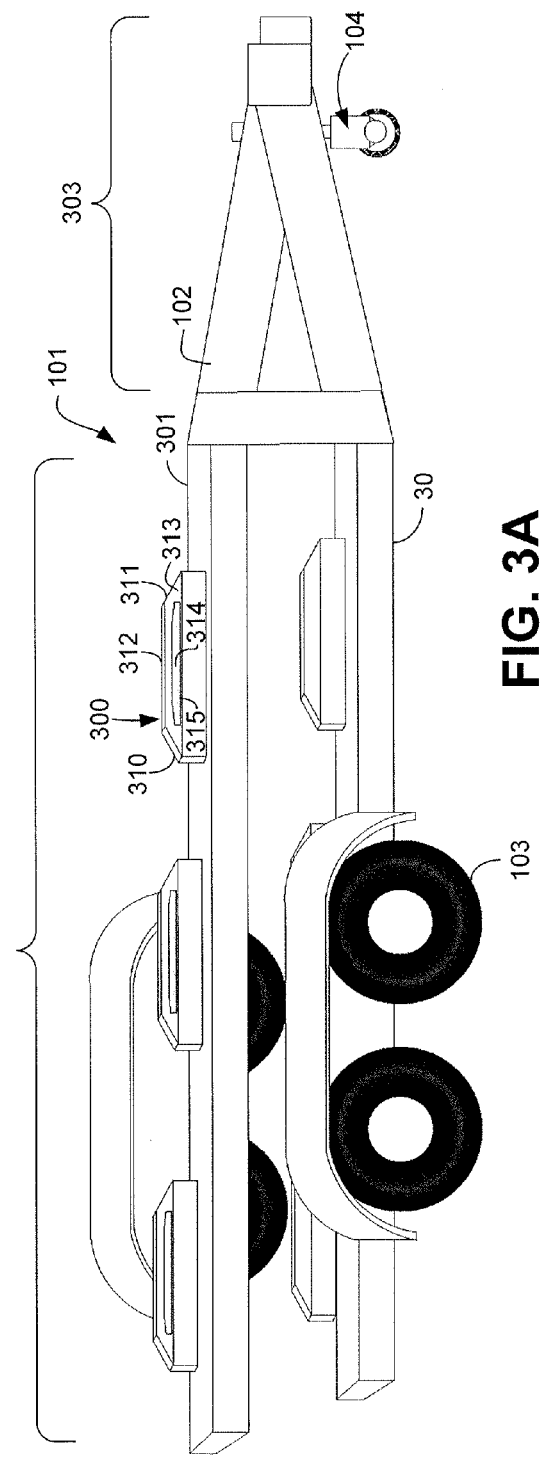

VEHICLE CONTAINMENT AND TRANSPORT SYSTEMS AND METHODS

CROSS-REFERENCE TO RELATED APPLICATIONS

This application claims priority to U.S. Provisional Patent Application Ser. No. 62/060,861 entitled Bike Box Systems and Methods filed on Oct. 7, 2014, which incorporated by reference in its entirety.

BACKGROUND

Many people ride motorcycles for entertainment as opposed to everyday transportation. Oftentimes, motorcyclists store their motorcycles in a garage or other building. When the motorcyclists do not have a garage or other storage facility, they may store them outside where the motorcycle is exposed to the elements.

Additionally, due to the entertainment use of motorcycles, a motorcyclist often enjoys taking their motorcycles on trips. The motorcyclist may not use the motorcycle as his/her primary mode of transportation in making the trip. Thus, the motorcyclist may desire to tow the motorcycle on the back of a primary vehicle and use the motorcycle at the motorcyclist's destination.

SUMMARY

A system of the present disclosure has a housing that has at least two female indentations, and each indentation has tapered walls that form a cavity. The system further has a trailer that has at least two protrusions, including a first protrusion on a first leg of the trailer and a second protrusion on a second leg of the trailer, and the protrusions are arranged to mate with the at least two female indentations when the housing is placed on the trailer. Each protrusion has a lock slat slidably moveable in a slot formed in a side of the protrusion and the lock slats are adapted to engage one of the tapered walls of the protrusions thereby retaining the housing on the trailer.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 3A is a perspective view of a trailer of the containment system of FIG. 1.

FIG. 3B is a top view of a protrusion of the trailer depicted in FIG. 3A.

DETAILED DESCRIPTION

The present disclosure describes systems and methods for containment and transport of vehicles.

Figure 1:
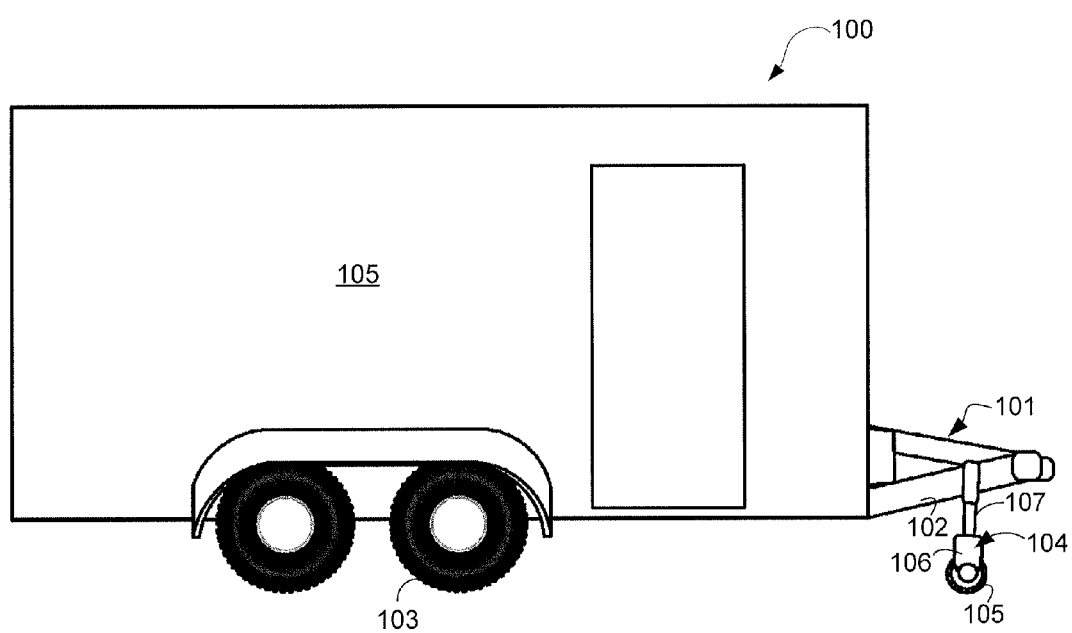
FIG. 1 is a side view of a vehicle containment system in accordance with an embodiment of the present disclosure.

FIG. 1 depicts a side view of a vehicle containment and transport system 100 in accordance with an embodiment of the present disclosure. The system 100 comprises a vehicle housing 105 that is coupled to a trailer 101.

In the embodiment depicted, the housing 105 is rectangular. However, the housing 105 may be other shapes in other embodiments.

The trailer 101 comprises a frame 102 and a set of side wheels 103 coupled thereto. Note that the embodiment depicted has two wheels 103 on each side of the trailer 101. However, more or fewer wheels 103 may be used in other embodiments.

Additionally, the system 100 comprises a motorized front wheel 104 coupled to the frame 102 via a shaft 107. In one embodiment, the housing 106 houses a motor (not shown) that powers the wheel 104. Note that the power supplied may be from a battery within the housing in on embodiment. In another embodiment, the motor within the housing may be electrically connected to central power source located in the housing 105 via electrical wires.

Figure 2:
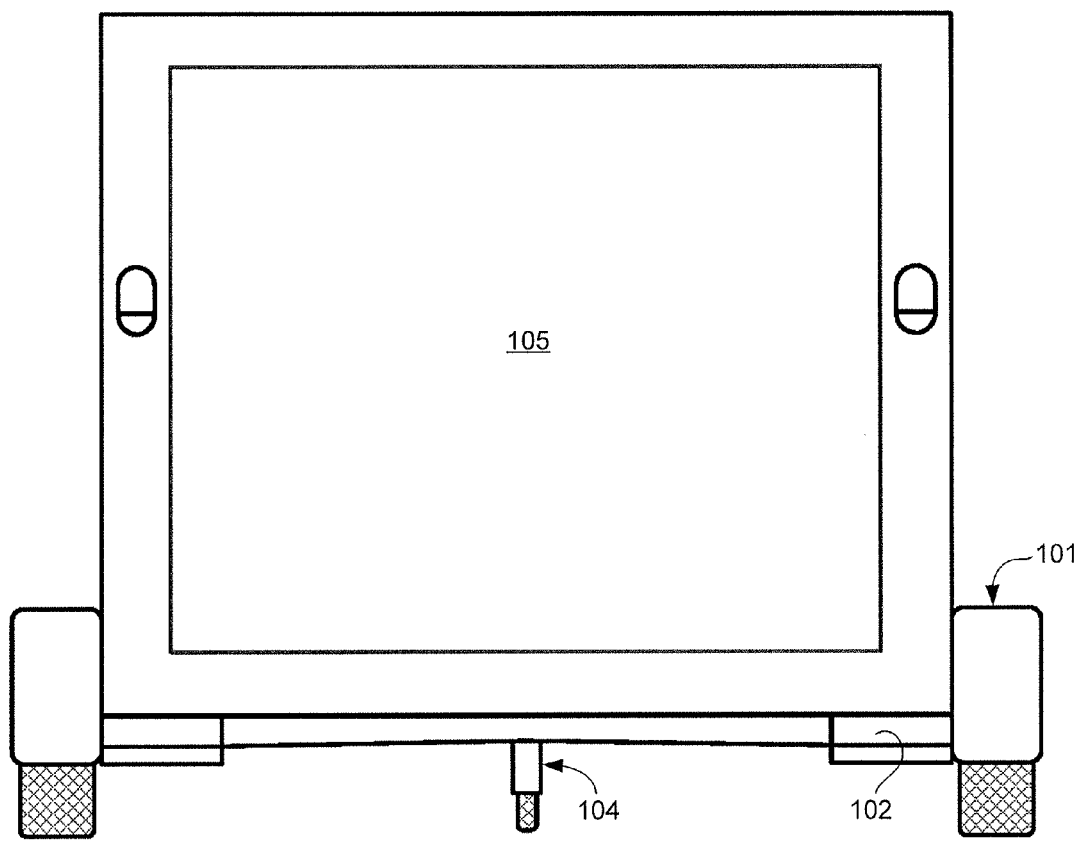
FIG. 2 is a back view of the vehicle containment system of FIG. 1.

FIG. 2 depicts a backend view of the system 100 depicted in FIG. 1. FIG. 2 depicts the housing 105 coupled to the frame 102 of the trailer 101. Further, FIG. 2 depicts the motorized wheel 104.

FIG. 3A is a perspective view of the trailer 101 with the housing 105 removed for clarity of description. In operation, the housing 105 is coupled to the trailer 101, which is described further herein.

The trailer 101 comprises the frame 102. The frame 102 comprises a substantially triangle-shaped A-frame member 303 and a substantially rectangular member 304 that comprises a pair of legs 301 and 302, which extend from the A-frame member 303. During use, a hitch 305 couples to a towing vehicle (not shown), and the trailer 101 is transported via the wheels 103.

Each leg 301 and 302 comprises one or more male protrusions 300 that project from the legs 301 and 302. In one embodiment, these protrusions are substantially rectangular yet comprise slightly tapered surfaces 310-313 on a top portion of the protrusions 300.

FIG. 3B depicts a top view of the protrusion 300. In this regard, the top portion of the protrusion comprises tapered surfaces 310-313. Further, the protrusion 300 comprises a slot 315 that houses a lock slat 314. The lock slat 314 is described further herein.

Figure 3D:
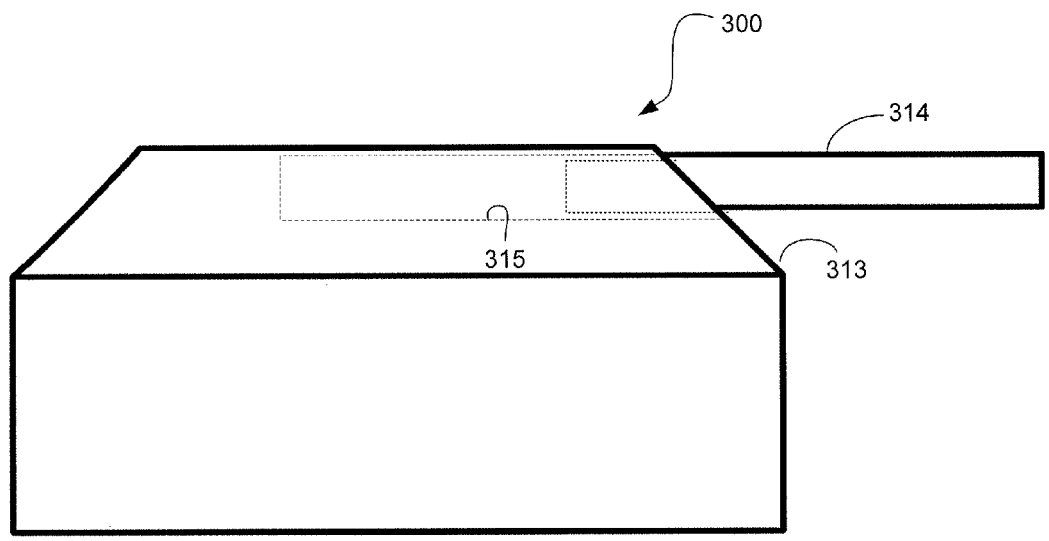
FIG. 3D is a side view of the protrusion depicted in FIG. 3B with the lock slat in a lock position.
Figure 3C:
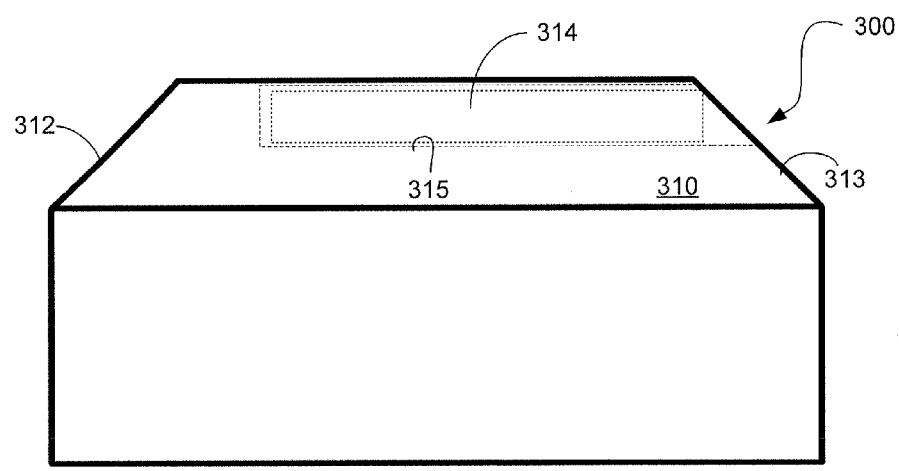
FIG. 3C is a side view of the protrusion depicted in FIG. 3B with a lock slat in a closed position.

FIG. 3C is an end view of the protrusion 300. The end view of the protrusion 300 shows three tapered surfaces 310, 312, and 313. Further, the end view depicts the slot 315 that opens to the tapered surface 313. The protrusion comprises a lock slat 314 that fits within the slot 315 when the system 100 is in an unlocked state.

FIG. 3D is the end view of the protrusion 300 such as is depicted in FIG. 3C with the lock slat actuated. FIG. 3C depicts what is referred to hereinafter as the "unlocked state." Whereas, FIG. 3D depicts what is referred to hereinafter as the "locked state."

In one embodiment, the lock slat 314 is mechanically actuated. In this regard, the system 100 may comprise one or more handles (not shown) that coupled to each of the respective protrusions 300 and to the lock slat 314. Thus, when the handle is actuated, the lock slat 300 extends from the surface 313 and is coupled to an opening in the housing 105 (FIG. 1), which is described further herein.

In another embodiment, the lock slat 314 is coupled to a motor (not shown) that is powered by a battery (not shown). The battery may be one that is in the vehicle (not shown) that is towing the trailer 101, or the power source may be housed in the housing 105.

Whether manually and mechanically actuated or electrically actuated, the lock slat 314 that is housed in the slot 315 extends to the locked state when activated. Further, the lock slat 314 retracts into the unlocked state when activated.

Figures 3E, 3F:
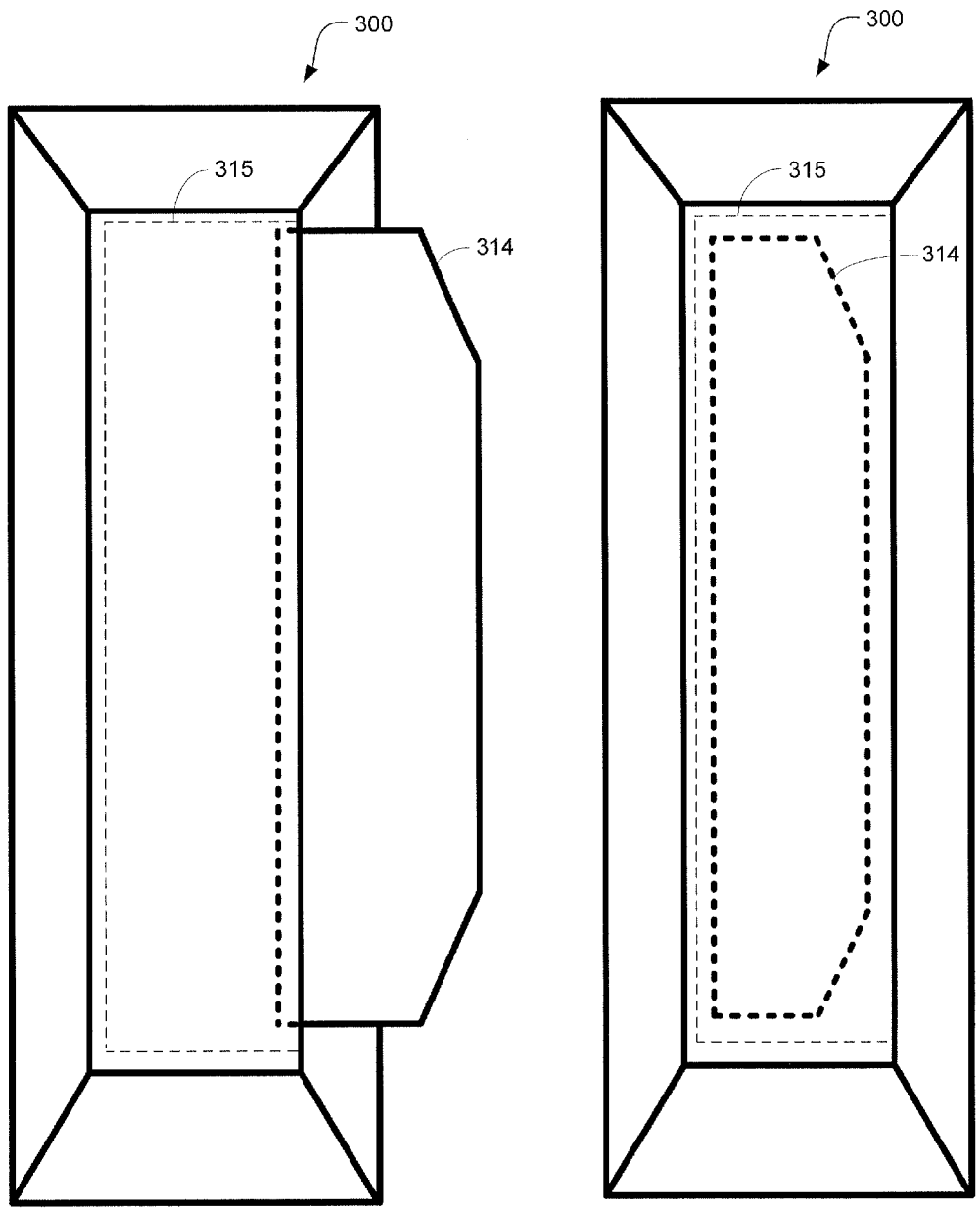
FIG. 3E is a top view of the protrusion depicted in FIG. 3B with a lock slat in a closed position.
FIG. 3F is a top view of the protrusion depicted in FIG. 3B with the lock slat in a lock position.

FIG. 3E is a top view of the protrusion 300 in the unlocked state. In this regard, the lock slat 314 is fully seated in the slot 315. FIG. 3F is a top view of the protrusion 300 in the locked state. In this regard, a portion of the lock slat extends from the slot 315.

Figure 4A:
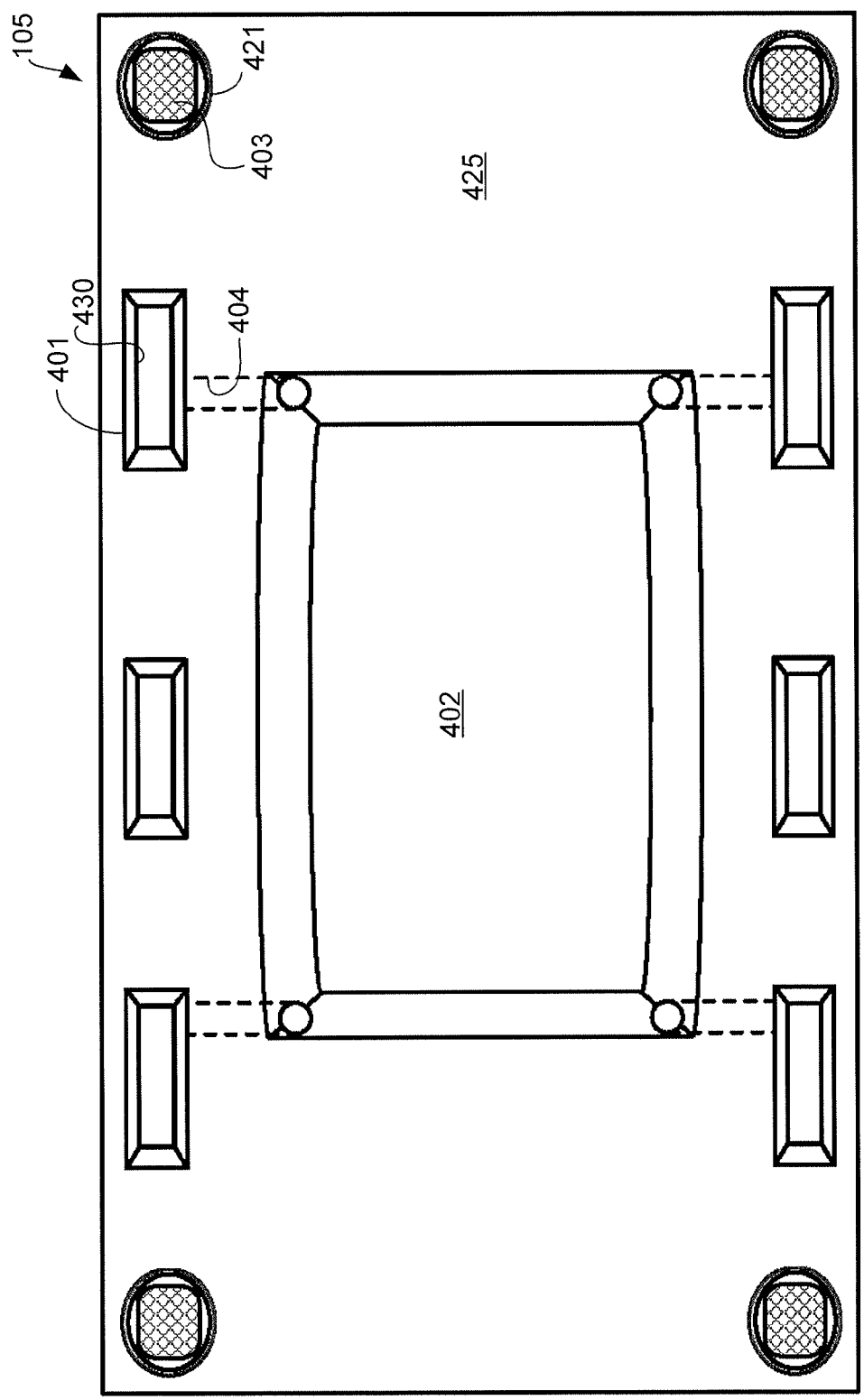
FIG. 4A is an bottom view of a housing of the system depicted in FIG. 1.

FIG. 4A depicts a bottom surface 425 of the housing 105, which is described with reference to FIG. 1. In one embodiment, the bottom surface 425 of the housing 105 comprises a plurality of openings 421 in which are retracted a plurality of wheels 403 that when extended, raises the housing 105 upward and mobile on the ground. In one embodiment, the wheels 403 are powered by a motor (not shown), which is described further herein with reference to FIGS. 11 and 12.

Additionally, the bottom surface 425 of the housing 105 comprises a plurality of female substantially rectangular indentations 401 with openings 430. Note that the female openings 403 receive the male protrusions 300 when the housing 105 (FIG. 1) is situated atop the trailer 101.

Figure 4B:
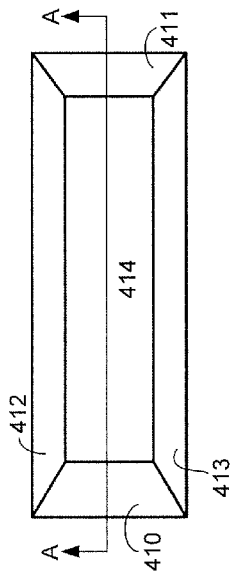
FIG. 4B is a top view of an indentation of the housing depicted in FIG. 4A.

FIG. 4B is a top view of the female opening 401. The opening 401 comprises a plurality of tapered walls 410-413. The tapered walls define a cavity 414, which receives the male protrusion 300.

Figure 4C:
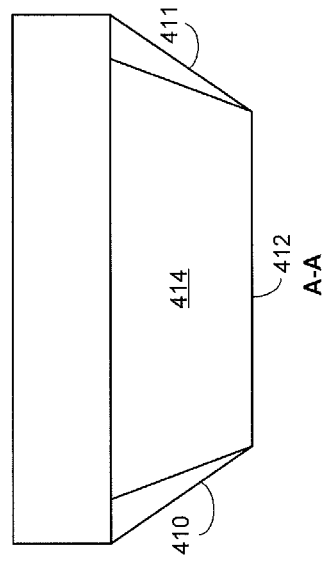
FIG. 4C is a side view of an indentation of the housing depicted in FIG. 4A.

FIG. 4C depicts a cross-sectional view taken along A-A in FIG. 4B. Notably, the tapered walls 410-412 define the cavity 414, which receives the male protrusion.

Figure 4D:
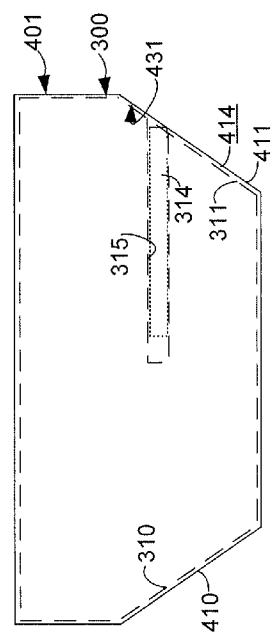
FIG. 4D is a side view of an indentation of the housing depicted in FIG. 4A mated with a protrusion.

FIG. 4D depicts an end view of the mating of the male protrusion 300 with the female indentation 401. In this regard, the male protrusion 300 sits within the cavity 414. In the locking state, the locking slat 314 extends from the slot 315, and the locking slat 314 retains the male protrusion 300 within the female cavity 414 by abutting an inside surface 431 of the tapered wall 411.

Note that in the embodiment depicted in FIGS. 3A and 4A, there are six (6) male protrusions 300 shown on the trailer 101 and six (6) corresponding female indentations 401 with openings 430. While six (6) are shown, there may be more or fewer protrusions 300 and more or fewer corresponding openings 430 in other embodiments of the present disclosure.

With further reference to FIG. 4A, the bottom surface 425 further comprises a substantially rectangular opening 402. Further, there are four channels 404 extending from the rectangular opening 402. The opening 402 receives a lift system (not shown), and the channels 404 receive locking bars (not shown) coupled to the lift system, as further described herein.

Figure 5:
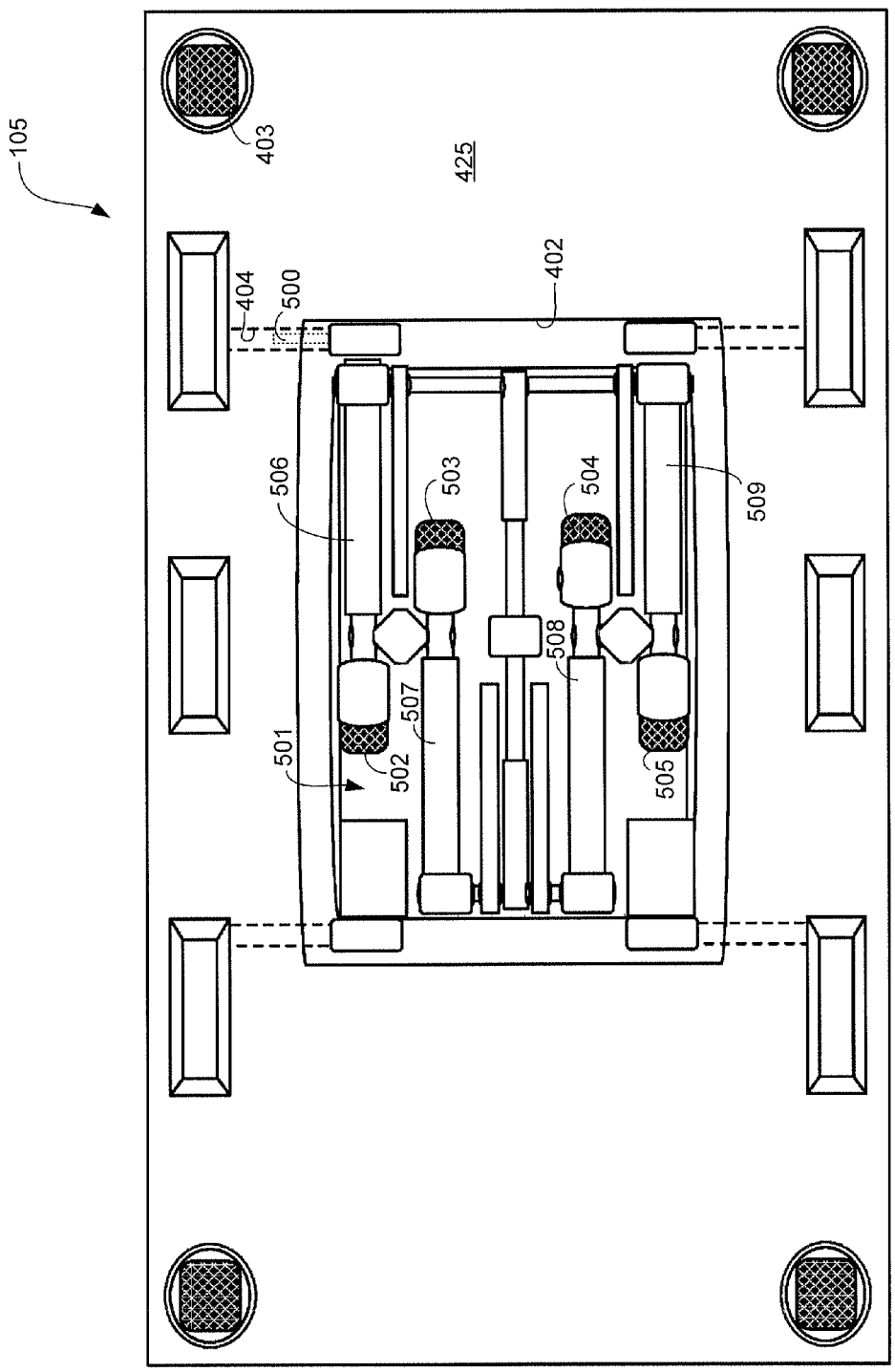
FIG. 5 is an bottom view of the housing depicted in FIG. 1 with a lift system attached thereto and in a stowed position.

FIG. 5 depicts the bottom surface 425 of the housing 105 with lift system 501 installed in the substantially rectangular opening 402. In this regard, the lift system 501 is removeable from the housing 105. Thus, the lift system 501 may be installed in another housing (not shown) when the lift system 501 is not in use with the housing 105.

The lift system 501 comprises four legs 506-509. Each leg 506-509 is coupled to wheels 502-505, respectively. Further, leg 506 is rotatably coupled to leg 507, and leg 508 is rotatably coupled to leg 509. FIG. 5 shows the lift system 501 with the legs retracted, which is hereinafter referred to as the "stowed position." When in the stowed position, the lock bars 500 may be actuated so as to remove the lock bars 500 from the channels 404. Thus, the lift system 501 can be used on other implements when the lift system 501 is not being used with the housing 105.

Figure 6:
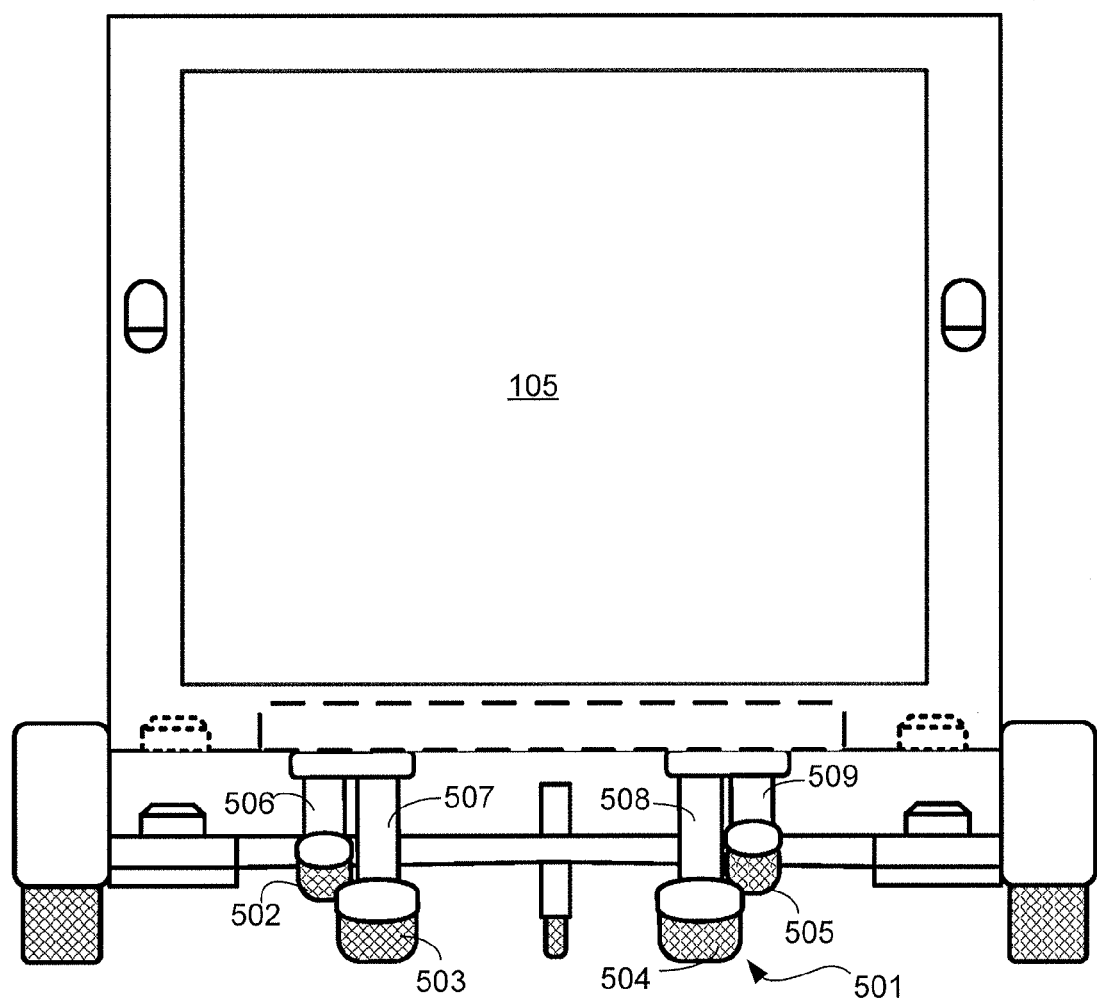
FIG. 6 is a back view of the system 100 depicted in FIG. 1 showing the lift system in a protracted position.

FIG. 6 depicts the lift system 501 with the legs 507-508 protracted, which is hereinafter referred to as the "protracted position." When changing the lift system to the protracted position from the stowed position, the locking slats 314 (FIGS. 3A-3F) are actuated so that the locking slats 314 rest entirely in the slots 315 (FIGS. 3A-3F). Thus, the housing is no longer coupled to the trailer 101 (FIG. 3A). As described hereinabove, the locking slats 314 may be manually, hydraulically, or electrically decoupled from the female indentions 401 (FIG. 4A).

When the male protrusions 300 (FIG. 3A-3F) are decoupled from the female indentations 401, the housing 105 is decoupled from the trailer 105. The housing 105 may then be moved from the trailer 101 via the lift system 501.

In one embodiment, the lift system 501 may be protracted via a manual actuator. For example, the lift system 501 may comprise a handle (not shown) that when actuated lets down the legs 506-509. In another embodiment, each leg 506-509 may be coupled to respective motors that when switched on let down the legs 506-509. In another embodiment, the legs 506-509 may be controlled by a hydraulic system (not shown) that when switched on lets down the legs 506-509.

Figure 7:
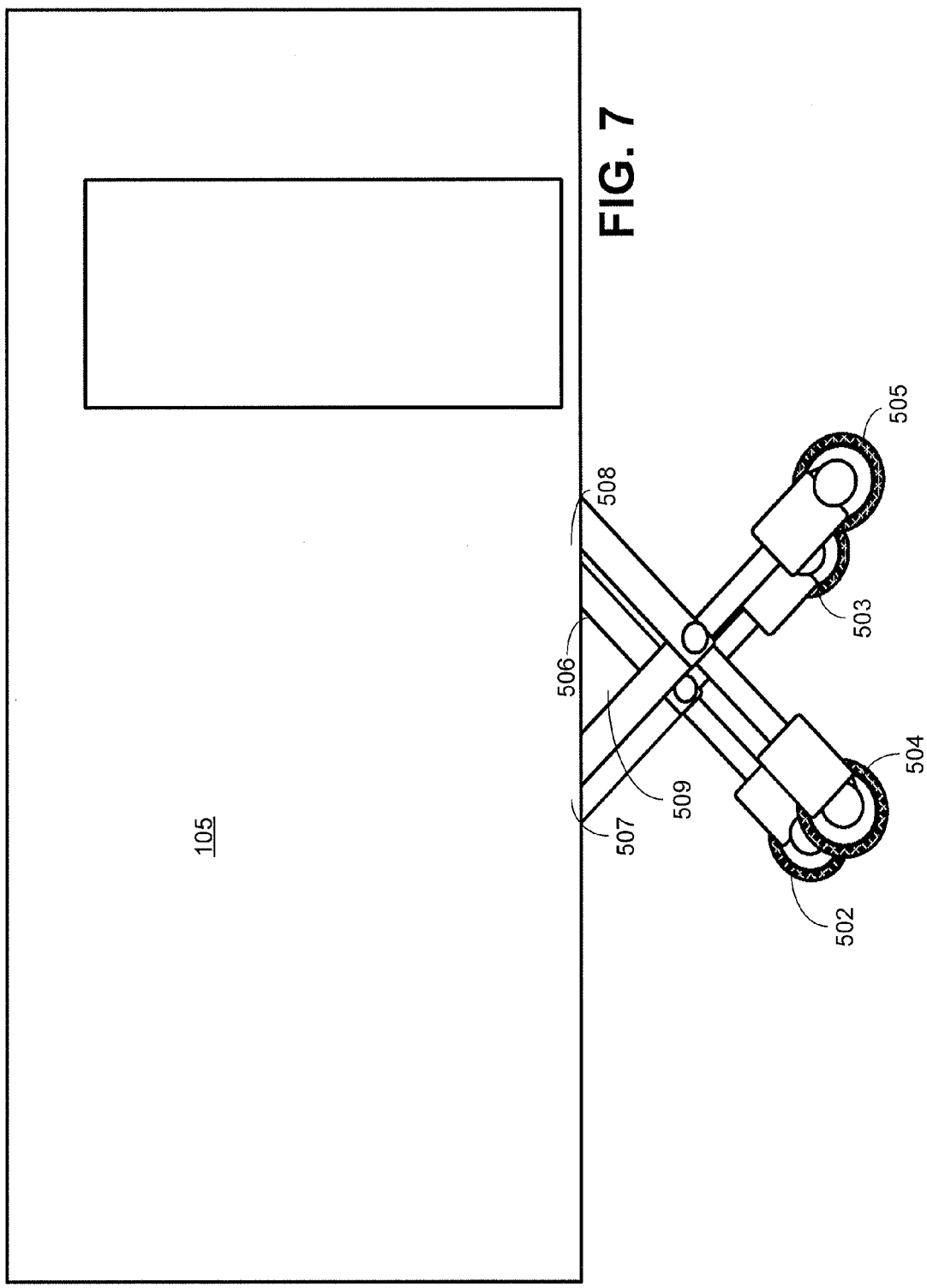
FIG. 7 is a side view of the housing of the system depicted in FIG. 1 with the lift system in a protracted position and the housing decoupled from the trailer.

When the legs 506-509 are in the protracted position, the trailer 101 may be driven out from underneath the housing 105. Once the trailer 101 is driven out from underneath the housing 105, the housing is then moveable on wheels 502-505, as is depicted in FIG. 7.

Note that the wheels 502-505 may also be powered by motors (not shown). In this regard, the wheels 502-505 may move at the direction of the user and powered by the motors. This is further described with reference to FIGS. 11 and 12.

Figure 8:
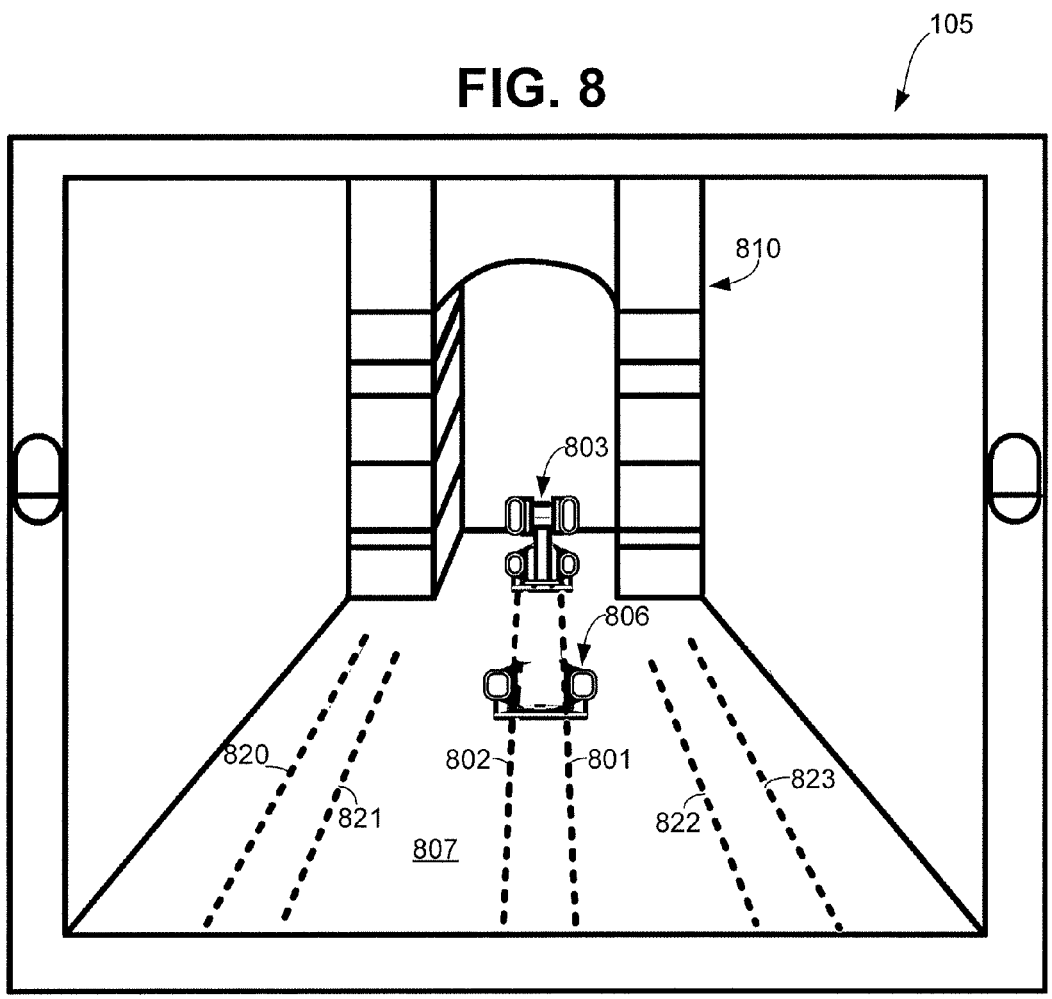
FIG. 8 is a perspective view of the interior of the housing depicted in FIG. 1.

FIG. 8 depicts an exemplary interior of the housing 105 of FIG. 1 in accordance with an embodiment of the present disclosure. In a floor 807 of the housing 105 are channels 801 and 802. Coupled to the channels 801 and 802 are chock stands 803 and 806.

In one embodiment, a motorcycle (not shown) is secured to the housing 105 via the chock stands 803 and 806. In another embodiment, the chock stands 803 and 806 may be removed by sliding the chock stands 803 and 806 from the channels 801 and 802.

In one embodiment, the floor 807 of the interior of the housing 105 comprises additional channels 820, 821 and 822, 823. In such an embodiment, two sets of chock stands 803 and 806 may be slidably coupled to the channels 820, 821 and 822, 823 so that two motorcycles can be installed in the housing 105.

Further, the interior of the housing 105 comprises a plurality of storage compartments 810. In one of the compartments 810, an actuation source, e.g., an electrical or hydraulic system, may be installed to control the lift system 501 (FIG. 5), the lock slats 314 (FIGS. 3A-3F)

Figure 9:
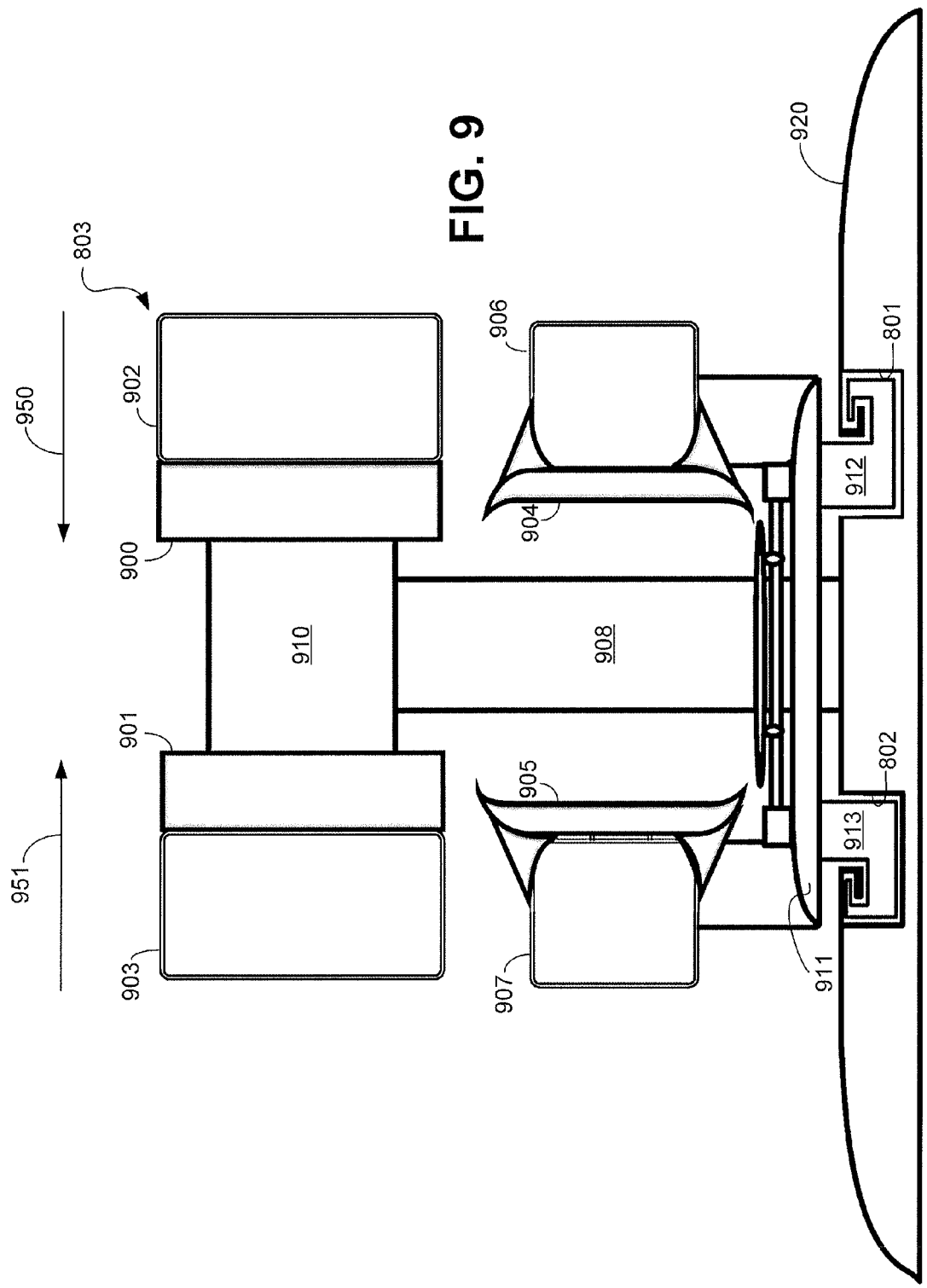
FIG. 9 is a front view of a chock stand used in the interior of the housing depicted in FIG. 8 with the clamps in an open position.

FIG. 9 depicts an exemplary chock stand 803 in accordance with an embodiment of the present disclosure. The chock stand 803 is slidably installed by manual insertion of two feet 912 and 913 into channels 801 and 802 of the floor 807 (FIG. 8).

In one embodiment, the chock stand 803 may comprise a bracket 920 that has channels similar to 801 and 802. In such an embodiment, the bracket 920 would be installed onto a floor of a housing so that the chock stand 803 could be installed therein.

The chock stand 803 comprises two sets of clamps, including 900, 901 and 904, 905. Each set of clamps clamp to a front wheel of a motorcycle.

The chock stand 803 comprises two mounting brackets 902 and 903 to which the clamps 900 and 901 are slidably mounted. The mounting brackets 902 and 903 are respectively coupled to a mounting bar 910.

The chock stand 803 further comprises mounting brackets 906 and 907 to which the clamps 904 and 905 are slidably mounted. The respective mounting brackets 906 and 907 are respectively coupled via a mounting plate 911.

In operation, a wheel (not shown) of a motorcycle (not shown) is rolled up onto the floor 807 of the housing 105 and moved between the clamps 900, 901 and 904, 905. When the wheel is fully inserted between the clamps 900, 901 and 904, 905, the tire (not shown) of the wheel presses against a pressure plate 910. When pressure is applied by the tire to the pressure plate 910, the clamps 900, 901 move inward as indicated by reference arrows 950, 951, respectively, thereby securing the tire, the wheel and the motorcycle. Also, when pressure is applied by the tire to the pressure plate 910, the clamps 904, 905 move inward as indicated by reference arrows 950, 951, respectively, thereby securing the tire, the wheel and the motorcycle.

In one embodiment, the pressure plate 910 comprises one or more pressure sensors. When the pressure sensor detects a pressure above a threshold, a hydraulic system (not shown) is activated thereby causing the clamps 900, 901 and 904, 905 to move inward and grasp the tire of the wheel of the motorcycle being loaded on the housing 105.

In another embodiment, the pressure plate 910 may rest on its back surface against an electrical switch. When pressure is applied to the pressure plate 910, the switch is activate, and the hydraulic system is activated thereby causing the clamps 900, 901 and 904, 905 to move inward and grasp the tire of the wheel of the motorcycle being loaded on the housing 105.

In the embodiment of a hydraulic system, one of the compartments 810 (FIG. 8) comprises a hydraulic system that is coupled via air conduits to the clamps 900, 901 and 906, 907.

Figure 10:
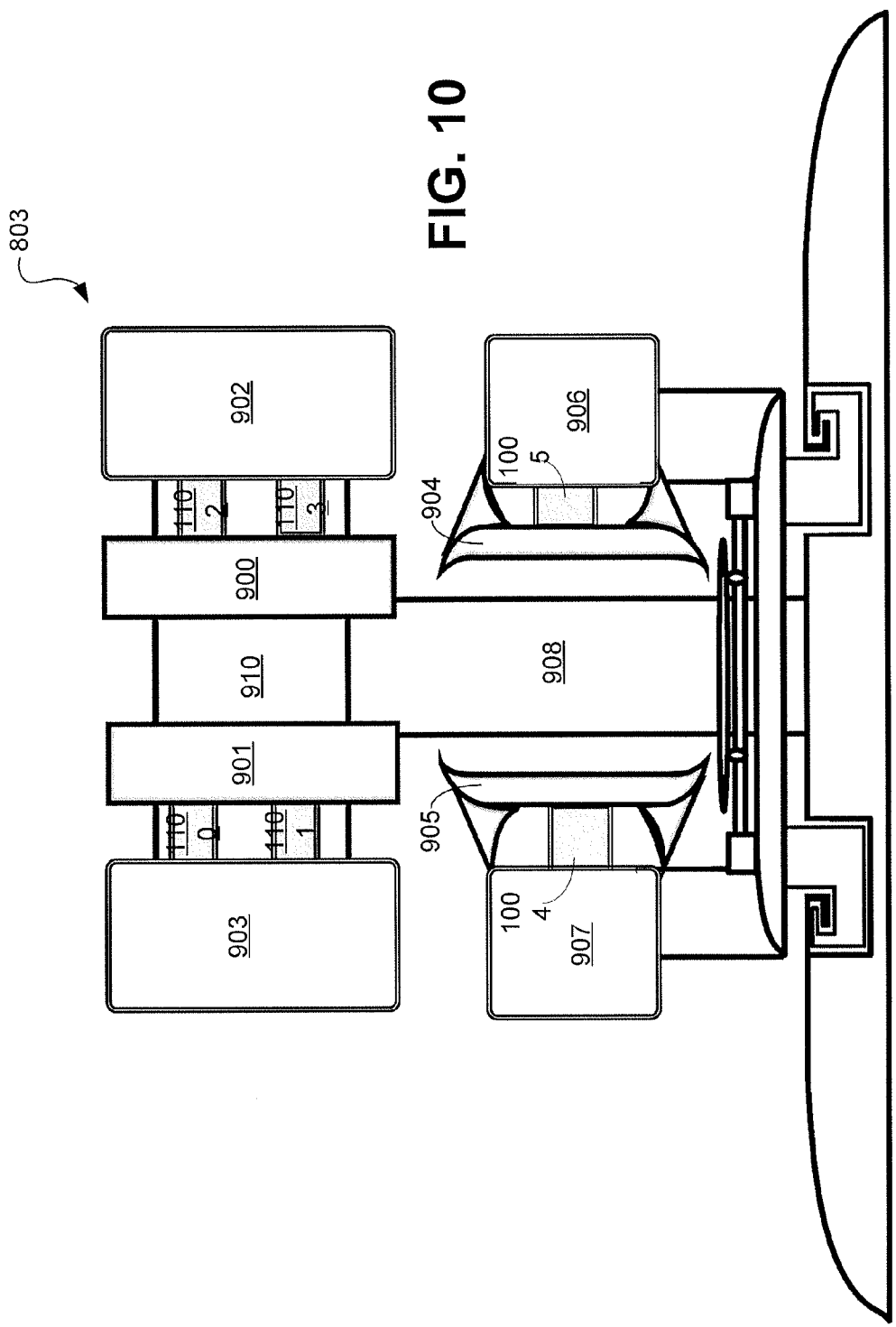
FIG. 10 is a front view of the chock stand depicted in FIG. 9 with the clamps in a clamping position.

FIG. 10 depicts the chock stand 803 when the clamps 900, 901 and 904, 905 have been actuated. As indicated, the clamps 900, 901 and 904, 905 are actuated inward to grasp the tire of a wheel of a motorcycle.

In this regard, the clamp 900 is slidably coupled to the mounting bracket 902 via one or more slidable shafts 1002, 1003. Further clamp 901 is slidably coupled to the mounting bracket 903 via slidable shafts 1000, 1001. Additionally, clamp 904 is slidably coupled to the mounting bracket 906 via slidable shaft 1005, and clamp 905 is slidably coupled to the mounting bracket 907 via slidable shaft 1004.

Figure 11:
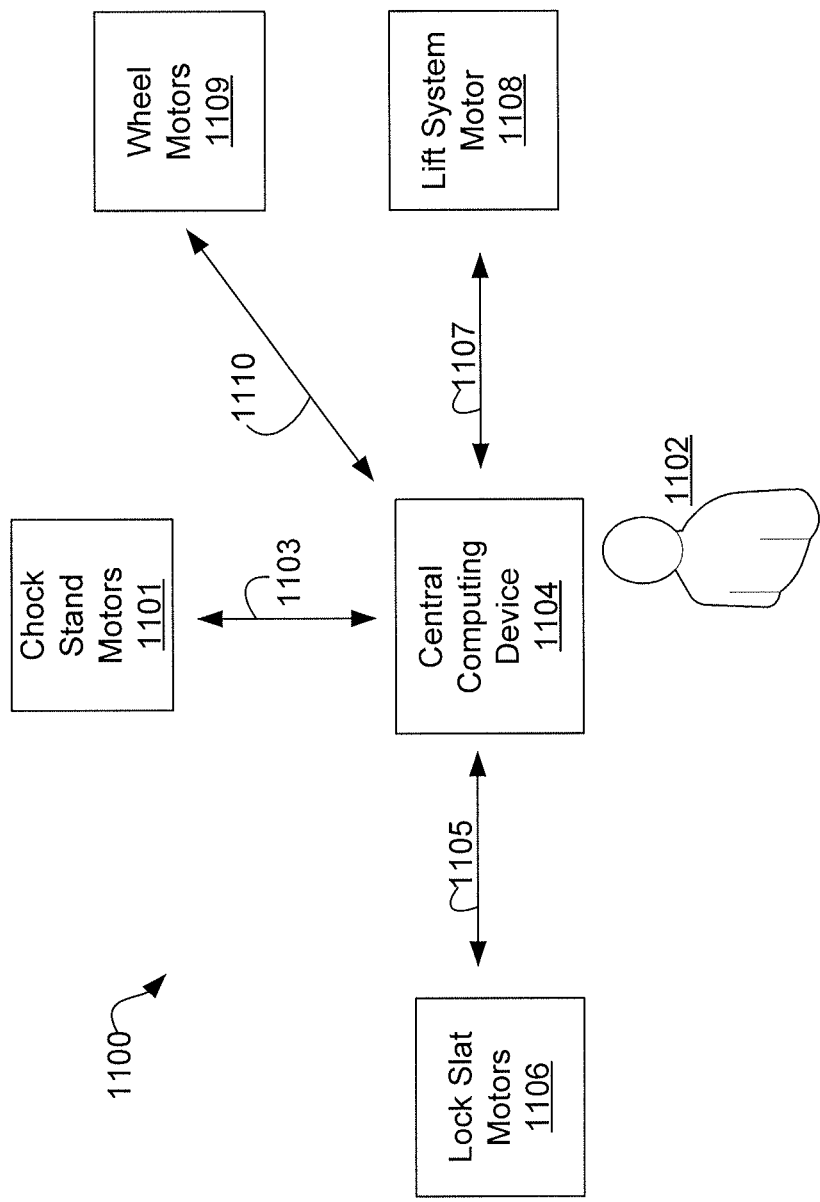
FIG. 11 is a block diagram of an exemplary system depicted in FIG. 1.

FIG. 11 depicts a system 1100 in accordance with an embodiment of the present disclosure. The system 1100 comprises a central computing device 1104 that is communicatively coupled to chock stand motors 1101, lock slat motors 1106, wheel motors 1109, and a lift system motor 1108 via communication links 1103, 1105, 1107, and 1110, respectively.

In one embodiment, the communication links 1103, 1105, 1107, and 1110 are cables that run from the central computing device 1104 to the chock stand motors 1101, the lock slat motors 1106, the wheel motors 1109, and the lift system motor 1108. In another embodiment, the central computing device 1102 may be communicatively coupled to the chock stand motors 1101, the lock slat motors 1106, the wheel motors 1109, and the lift system motor 1108 via a wireless link.

During operation, a user 1102 provides input to the central computing device 1104 to activate the lock slat motors 1106. The central computing device 1104 transmits a signal via the communication link 1105 to the lock slat motors 1106 indicative of activation. In response, the lock slat motors 1106 activate and move the lock slats 314 (FIG. 3A-3F) to a locked position engaging a tapered wall 410-413 (FIG. 4A-4C) of the female indentation 401 (FIG. 4A).

Additionally, as indicated hereinabove, in response to an input from a pressure sensor (not shown) or a switch (not shown), the central computing device 1104 transmits a signal via the communication link 1103 to the chock stand motors 1101 indicative of activation. In response, the chock stand motors 1101 activate closing the clamps 803 and 806 (FIG. 8) on a wheel of a vehicle, e.g., a motorcycle.

Further, the user 1102 provides input to the central computing device 1104 to activate the lift system motor 1108. The central computing device 1104 transmits a signal via the communication link 1107 to the lift system motor 1108 indicative of activation. In response, the lift system 501 (FIG. 5) activates moving to the stowed position or the protruded position.

In addition, the user 1102 provides input to the central computing device 1104 to activate the wheel motors 1109. The central computing device 1104 transmits a signal via the communication link 1110 to the wheel motors 1109 indicative of activation. In response, the wheels 403 (FIG. 4A), 105 (FIG. 1), and 502-505 (FIG. 6) thereby moving the housing 105 (FIG. 1) separate and apart from the trailer 101 (FIG. 1).

In regards to the wheel motors, the user 1102 may also input data indicative of direction of the wheels 502-505 and 403. In such an embodiment, the central computing device 1104 transmits data indicative of direction to the wheel motors 1109.

Figure 12:
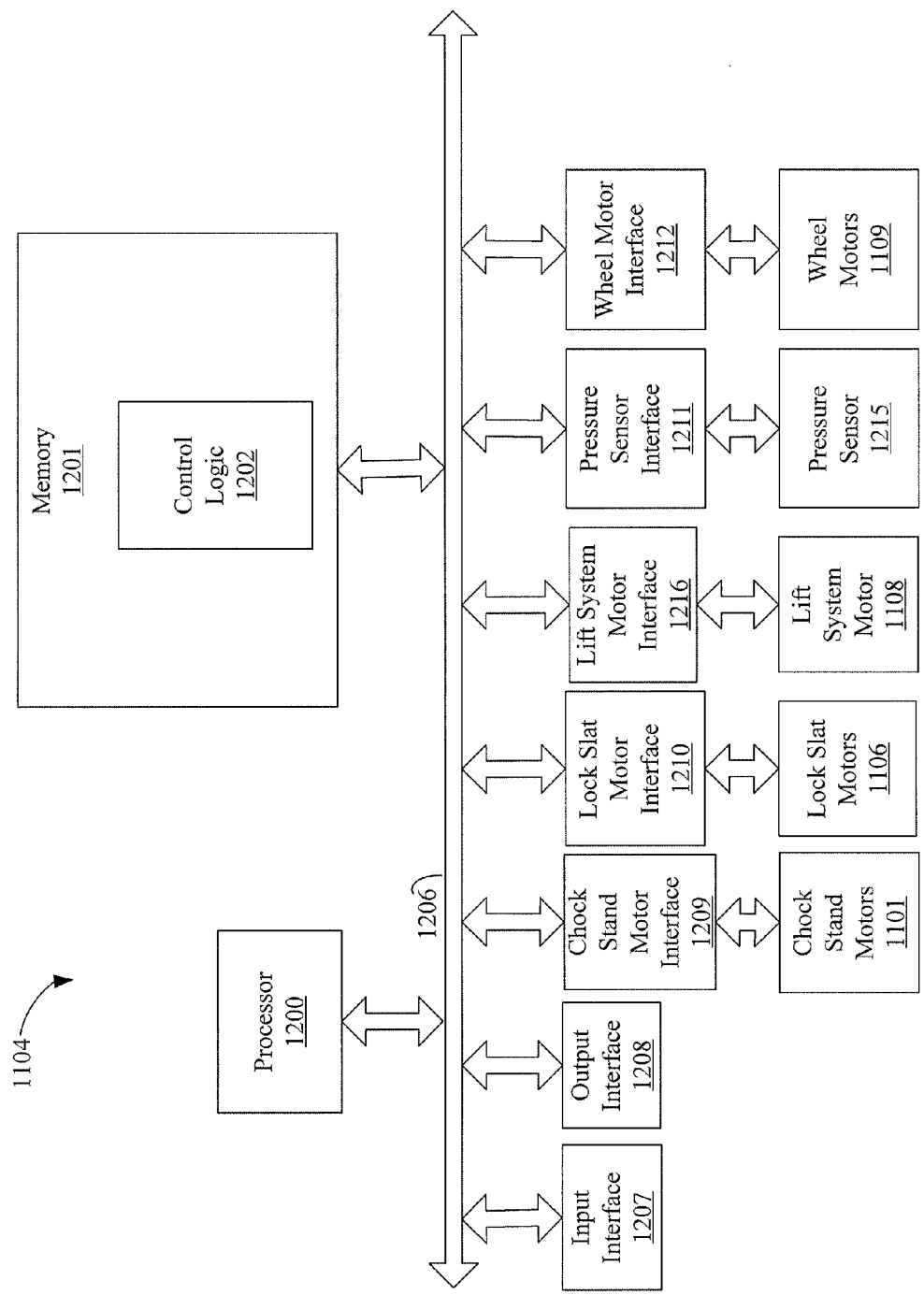
FIG. 12 is a block diagram of a computing device of the system depicted in FIG. 11.

FIG. 12 is a block diagram depicting an exemplary central computing device 1104 in accordance with an embodiment of the present disclosure. The exemplary computing device 1104 comprises processor 1200, output interface 1208, and input interface 1207. Additionally, the exemplary computing device 1104 comprises a chock stand motor interface 1209, a lock slat motor interface 1210, a lift system motor interface 1216, a wheel motor interface 1220, and a pressure sensor interface 1211. Each of these components communicates over local interface 1206, which can include one or more buses.

The central computing device 1104 further comprises control logic 1202. Control logic 1202 can be software, hardware, or a combination thereof. In the exemplary central computing device 1104 shown in FIG. 12, control logic 1202 is software stored in memory 1201. Memory 1201 may be of any type of memory known in the art, including, but not limited to random access memory (RAM), read-only memory (ROM), flash memory, and the like.

As noted hereinabove, the control logic 1202 is shown as stored in memory 1201. When stored in memory 1201, the control logic 1202 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

In the context of the present disclosure, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium Processor 1200 may be a digital processor or other type of circuitry configured to run the control logic 1202 by processing and executing the instructions of the control logic 1202. Further, the processor 1200 communicates with and drives the other elements within the central computing device 1104 via the local interface 1206.

The output interface 1208 is any type of device for providing information to the operator 1102 (FIG. 11). In this regard, the output interface may be, for example, a backlit liquid crystal display (LCD) screen (not shown). Other types of output interfaces 1208 may be, for example, an audio device that provides instructions to the operator 1202 audibly, light emitting diodes (LED) that show status of the system 1100 (FIG. 11), or any other type of output interface that provides sensory information to the operator. While some examples have been given, other types of output interfaces may be used in other embodiments of the present disclosure The input interface 1207 is any device that enables the operator to input data into the central computing device 1104. In one embodiment, the input interface 1207 is a touchscreen that allows the operator 1102 to provide information to the central computing device 1104 by selecting areas on the touch screen. In another embodiment, the input interface may be, for example, a keyboard or a microphone. In this regard, the user 1102 may use the keyboard to type data into the central computing device 1104. In one embodiment, the input interface 1207 may comprise a plurality of buttons, that when selected operate the system 1100. While some examples have been given, other types of input interfaces may be used in other embodiments of the present disclosure.

The lock slat motor interface 1210 transmits signals to a plurality of lock slat motors 1105. As indicated hereinabove, each lock slat 314 (FIGS. 3A-3F) is controlled by a respective lock slat motor 1106. Note that there may be a plurality of lock slat motors 1106 controlling each of the identified lock slats 314; however, for simplicity, the plurality of lock slat motors are shown as a single component, lock slat motors 1106.

As noted hereinabove, the plurality of lock slat motors 1106 interface with the lock slats 314 (3A-3F). In this regard, each lock slat 314 interfaces with a separate lock slat motor 1106. Thus, in operation, the user 1102 may select an input indicative of actuating the lock slats 314. In response, the control logic 1202 transmits data indicative of activation to the lock slat motor interface 1210, which transmits an activation signal to the lock slat motors 1106. In response, the lock slat motors 1106 activate and actuate the lock slats 314.

The chock stand motor interface 1209 transmits signals to a plurality of chock stand motors 1101. As indicated hereinabove, each chock stand 803 and 806 (FIG. 8) is controlled by a respective chock stand motor 1101. Note that there may be a plurality of chock stand motors 1101 controlling each of the identified chock stands 803 and 806; however, for simplicity, the plurality of chock stand motors 1101 are shown as a single component, chock stand motors 1101.

As noted hereinabove, the plurality of chock stand motors 1101 interface with the chock stands 803 and 806. In this regard, each chock stand 803 and 806 interfaces with a separate chock stand motor 1101.

Further, the pressure sensor interface 1211 receives data indicative of pressure applied to the pressure plate 910 (FIG. 9). The data may be indicative of the pressure that is being applied to the plate. In response, the control logic 1202 compares the data indicative of the pressure applied to a threshold pressure. If the data indicates that the threshold is met or exceeded, the control logic 1202 activates the chock stand motors 1101 via the chock stand interface 1209.

The lift system motor interface 1216 transmits signals to a lift system motor 1108. As indicated hereinabove, the lift system 501 (FIG. 5) is controlled by a lift system motor 1108. In one embodiment, the user 1102 (FIG. 11) may provide input via the input interface 1207 to let down the lift system, i.e., move it to a protracted position. In response, the control logic 1202 transmits a signal via the lift system motor interface 1216 to the lift system motor 1108, thereby activating the motor 1108. When the lift system 501 is in a protracted position, the user 1102 may provide input via the input interface 1207 to stow the lift system 501. In response, the control logic 1202 transmits a signal via the lift system motor interface 1216 to the lift system motor 1108 to stow the lift system 501.

The wheel motor interface 1212 transmits signals the wheels 403 (FIG. 4A), 502-505 (FIG. 6), and 105 (FIG. 1). In one embodiment, the user 1102 (FIG. 11) may provide input via the input interface 1207 to let activate the wheels 403, 502-505, and 105. In response, the control logic 1202 transmits a signal via the wheel motor interface 1212 to the wheel motors 1109, thereby activating the motor 1109.

The disclosure herein has been describing a system wherein a housing 105 (FIG. 1) comprises an opening 402 (FIG. 4A) for receiving the lift system 501 (FIG. 5). In one embodiment of the present disclosure, a lift system may be adapted to interface with an adapter plate. The adapter plate may be installed on any type of housing so that the housing can be lifted and place on a trailer.

Figure 13A:
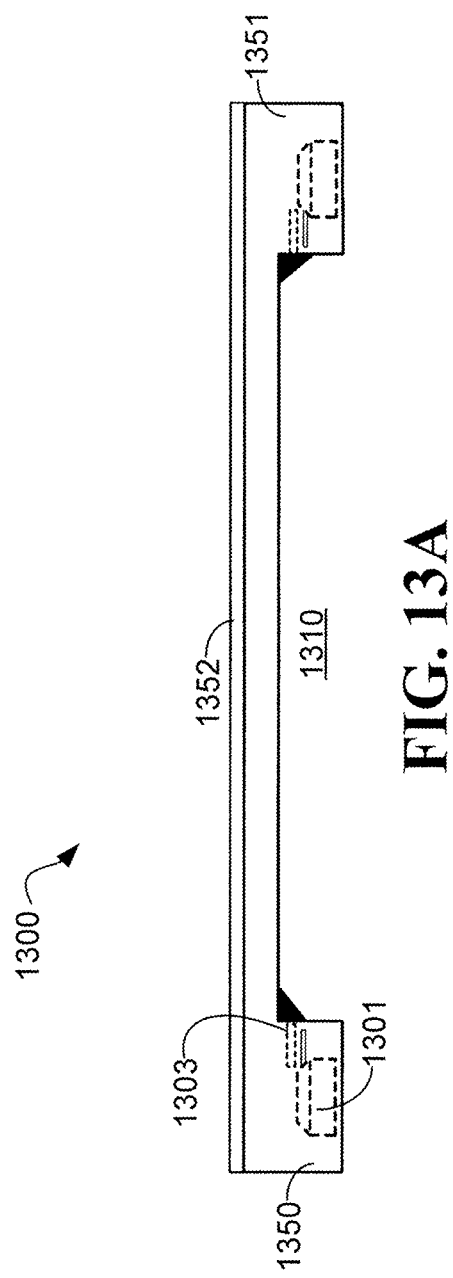
FIG. 13A is an exemplary adapter bracket in accordance with an embodiment of the present disclosure.

FIG. 13A depicts an adapter bracket 1300. The adapter bracket 1300 may be installed on an underside of any type of housing that a user (not shown) desires to be transported on a trailer 101 (FIG. 3A).

The adapter bracket 1300 is substantially U-shaped comprising a two legs 1350 and 1351 integral with a bridge member 1352 that connects the upper end of the legs 1350 and 1351. The legs 1350 and 1351 and the bridge member 1352 define a space 1310 for sliding a lift system onto the adapter bracket 1300. The adapter bracket 1300 further comprises female indentations 1301 for receiving protrusions 300 (FIG. 3A) on the trailer 101.

Additionally, the adapter bracket 1300 comprises a plurality of channels 1303. The channels 1303 are adapted to receive locking bars, as described further herein.

The adapter bracket 1300 may be coupled to the underside of the housing using any type of fastening means, such as, for example, bolts.

Figure 13B:
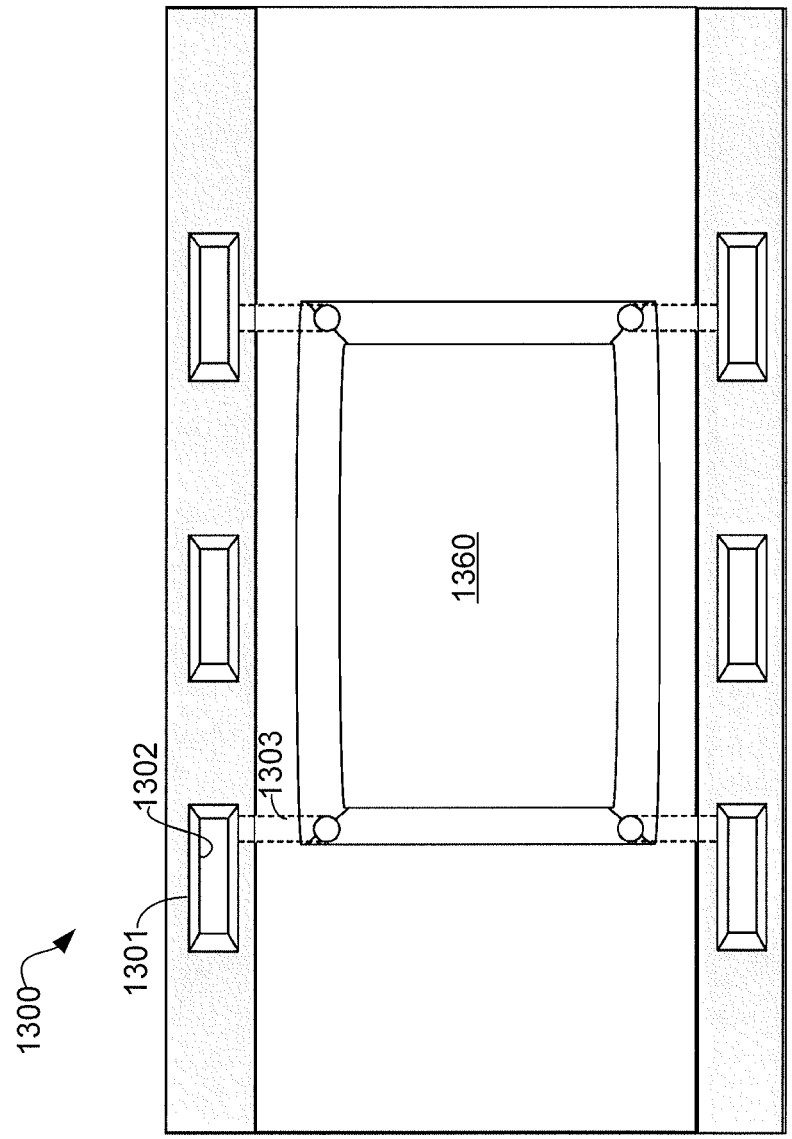
FIG. 13B is a bottom view of a housing for use with the adapter of FIG. 13A.

FIG. 13B depicts a bottom view of the adapter bracket 1300. The adapter bracket 1300 comprises the female indentations 1301 with openings 1302. Note that six (6) female indentations 1301 are shown on the adapter bracket 1300. However, more or fewer indentations 1301 are possible in other embodiments.

Figure 13C:
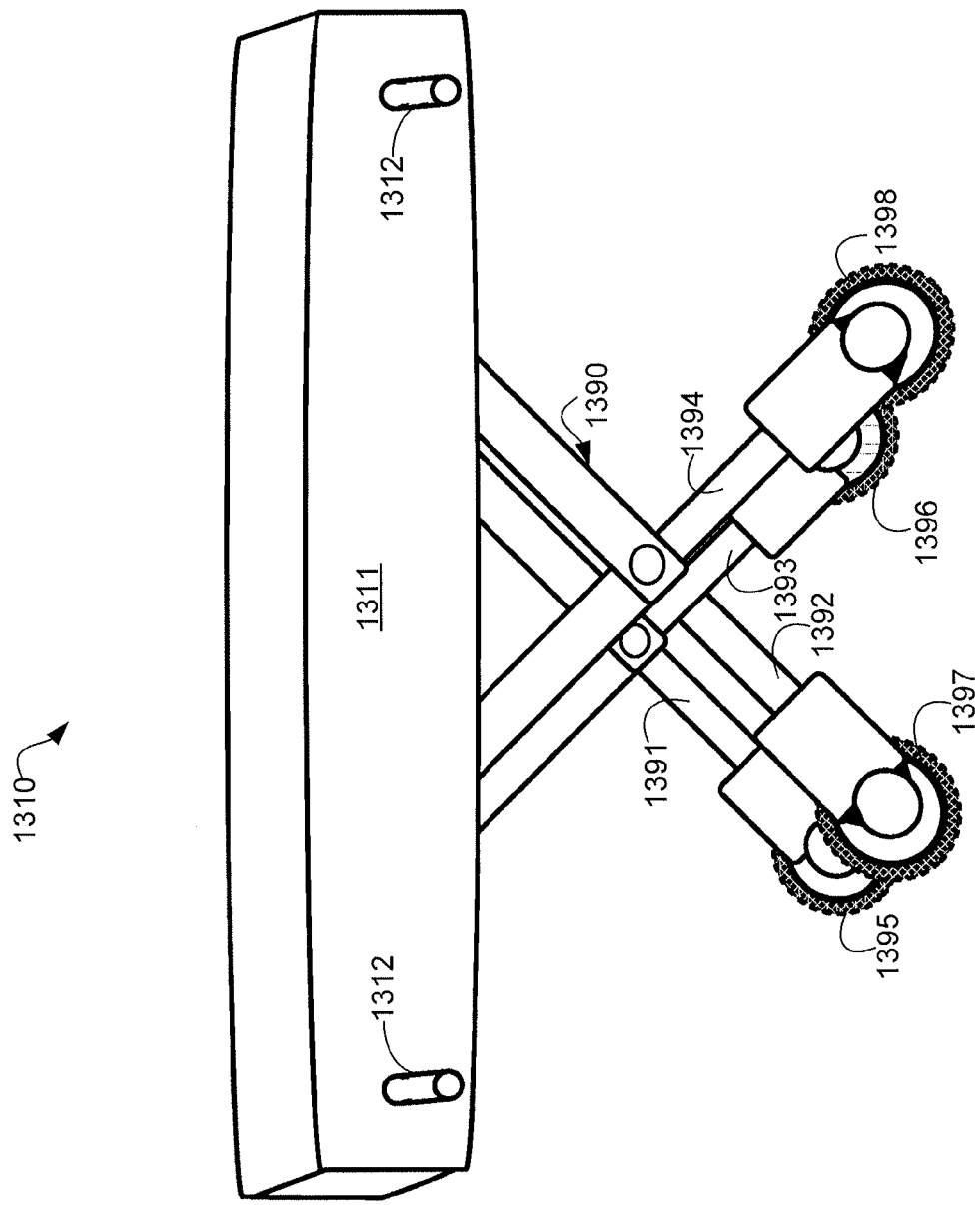
FIG. 13C is a side view a lift system for use with the adapter bracket of FIG. 13A.

The adapter bracket 1300 comprises a substantially rectangular opening 1360 adapted for receiving a lift system, which is shown in FIG. 13C. The adapter bracket 1300 further comprises one or more channels 1303 for receiving lock bars coupled to the lift system, which are shown in FIG. 13C.

FIG. 13C depicts a lift system 1390 that can be installed in opening 1360 (FIG. 13B). The lift system 1390 comprises a substantially rectangular box 1311 that is coupled to one or more lock bars 1312. The lock bars 1312 actuate from inside the box outward in the positions shown in FIG. 13C.

Further, the lift system 1390 comprises a plurality of legs 1391-1394. The legs 1391-1394 are coupled to wheels 1395-1398. As described hereinabove with reference to FIGS. 4 and 5, the lift system 1390 may be in a stowed position, i.e., the legs are contained within the housing 1311. In FIG. 13C, the legs 1391-1393 are shown in the protracted position.

Figure 13D:
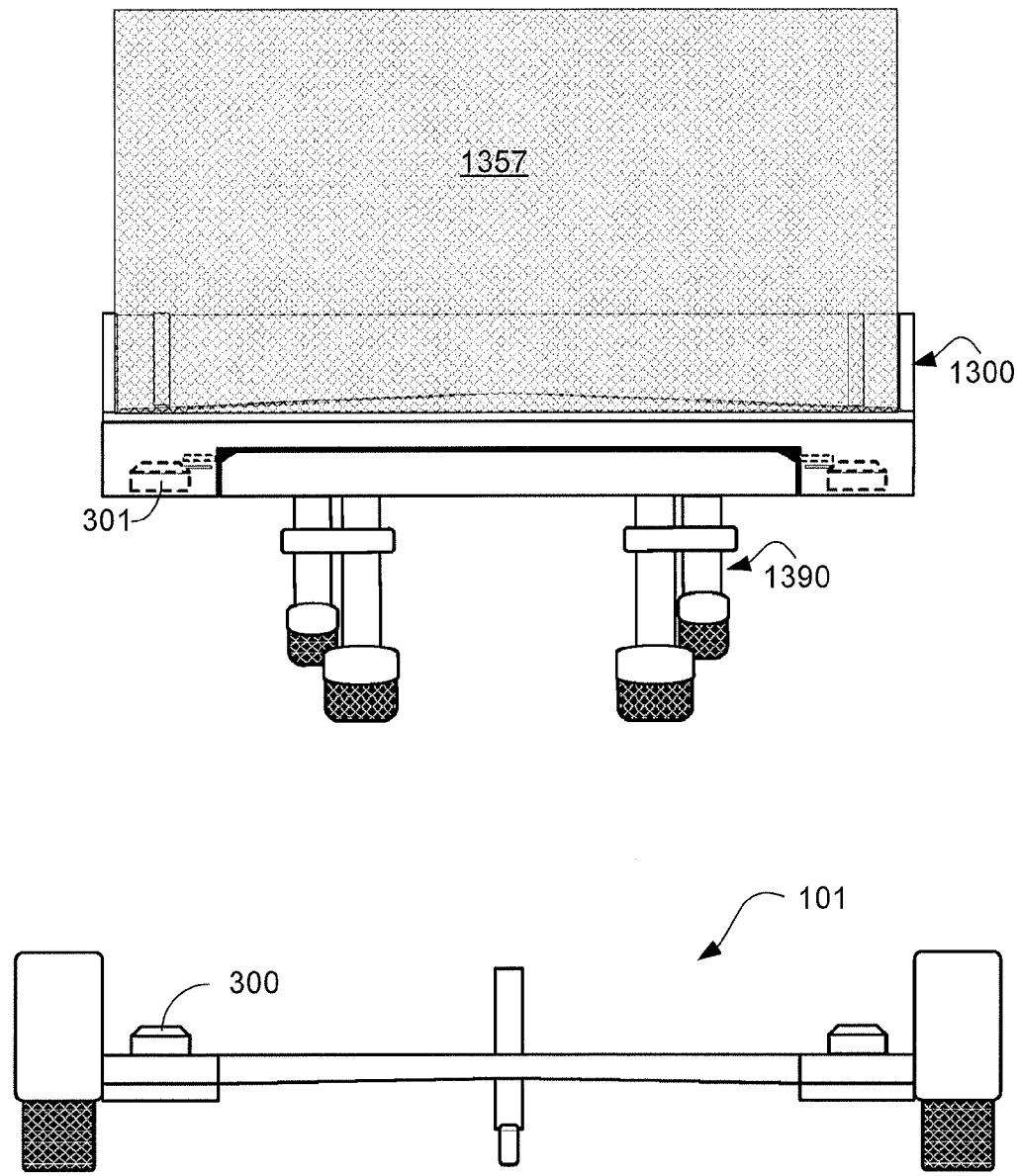
FIG. 13D is a back view of the housing and adapter bracket with a trailer in accordance with an embodiment of the present disclosure.

FIG. 13D depicts a housing 1357 coupled to the adapter bracket 1300. Further, the lift system 1390 is installed in the bracket 1300. FIG. 13D shows the lift system in the protracted position. In operation, the bracket couples to the protrusions 300 of the trailer 101.

Note that in using the adapter bracket, any housing may be adapted with a lift system and coupled to the trailer 101.

What I claim is:

1. A system, comprising:
  a housing comprising at least two female indentations, each indentation comprising tapered walls that form a cavity;
  a trailer having at least two protrusions, a first protrusion on a first leg of the trailer and a second protrusion on a second leg of the trailer, wherein the protrusions are arranged to mate with the at least two female indentations when the housing is placed on the trailer, wherein each protrusion has a lock slat slidably moveable in a slot formed in a side of the protrusion and the lock slats are adapted to engage one of the tapered walls of the protrusions thereby retaining the housing on the trailer, wherein each slat contained in each slot is coupled to a motor; and
  a computing device communicatively coupled to the motors.

2. The system of claim 1, wherein the trailer comprises a motorized wheel on an A-frame of the trailer.

3. The system of claim 1, wherein the computing device is configured for receiving an activation input from a user, and upon receipt, the computing device transmits a signal to each motor that activates the motor.

4. The system of claim 3, wherein upon activation by the motors, the lock slats slide out of the slot and engage the one tapered wall of the female protrusion.

5. A system, comprising:
  a housing comprising at least two female indentations, each indentation comprising tapered walls that form a cavity;
  a trailer having at least two protrusions, a first protrusion on a first leg of the trailer and a second protrusion on a second leg of the trailer, wherein the protrusions are arranged to mate with the at least two female indentations when the housing is placed on the trailer, wherein each protrusion has a lock slat slidable moveable in a slot formed in a side of the protrusion and the lock slats are adapted to engage one of the tapered walls of the protrusions thereby retaining the housing on the trailer, wherein the housing comprises at least one chock stand positioned for receiving a wheel of a vehicle.

6. The system of claim 5, wherein the chock stand comprises a first pair of clamps arranged for receiving and clamping a first portion of a wheel of the vehicle.

7. The system of claim 6, wherein the chock stand comprises a second pair of clamps arranged for receiving and clamping a second portion of the wheel of the vehicle.

8. The system of claim 7, wherein the first pair of clamps coupled to a second pair of clamps, wherein the first pair of clamps and the second pair of clamps are coupled to a motor.

9. The system of claim 8, further comprising a computing device communicatively coupled to the motor.

10. The system of claim 9, wherein the computing device is configured for receiving a user input indicative of activation of the motor and transmitting a signal to the motor to activate the motor.

11. The system of claim 9, wherein the computing device is configured for receiving data indicative of a pressure applied to a pressure plate coupled to the first pair of clamps and the second pair of clamps.

12. The system of claim 11, wherein the computing device is configured for comparing the data received to a threshold and transmitting a signal indicative of activation when the data indicates that the pressure has reached or exceeded the threshold.

13. The system of claim 5, wherein the housing comprises a rectangular opening in an underside of the housing adapted for receiving a lift system.

14. A system, comprising:
  a housing comprising at least two female indentations each indentation comprising tapered walls that form a cavity;
  a trailer having at least two protrusions, a first protrusion on a first leg of the trailer and a second protrusion on a second leg of the trailer, wherein the protrusions are arranged to mate with the at least two female indentations when the housing is placed on the trailer, wherein each protrusion has a lock slat slidably moveable in a slot formed in a side of the protrusion and the lock slats are adapted to engage one of the tapered walls of the protrusions thereby retaining the housing on the trailer, wherein the housing comprises at least one chock stand positioned for receiving a wheel of a vehicle, wherein the housing comprises a rectangular opening in an underside of the housing adapted for receiving a lift system, and wherein the lift system is substantially rectangular and comprises one or more lock bars.

15. The system of claim 14, wherein the housing comprises on or more channels arranged for receiving the one or more lock bars.

16. The system of claim 15, further comprising a motor coupled to the lift system.

17. The system of claim 16, further comprising a central computing device configured for receiving an input from a user to activate the lift system.

18. The system of claim 17, wherein the central computing device is further configured to transmit an activation signal to the lift system in response to the user input.

* * * * *